United States Patent
Rizkin et al.

[11] Patent Number: 5,986,792
[45] Date of Patent: Nov. 16, 1999

[54] LIGHTING SYSTEM SEQUENCER AND METHOD

[75] Inventors: Alexander Rizkin, Redondo Beach; Yevgeniy Y. Durets, Long Beach; Carl E. Oberg, North Hills; David Ruiz, Redondo Beach; Robert H. Tudhope, Rancho Palos Verdes, all of Calif.

[73] Assignee: farLight Corporation, Torrence, Calif.

[21] Appl. No.: 09/139,914

[22] Filed: Aug. 26, 1998

Related U.S. Application Data

[63] Continuation of application No. 09/018,081, Feb. 3, 1998.

[51] Int. Cl.[6] .................................................. G02B 26/08
[52] U.S. Cl. ........................ 359/212; 359/215; 359/226; 385/31
[58] Field of Search ............................ 359/196–226, 359/618, 629, 636; 385/18, 22, 31, 32, 901; 362/32, 341, 347

[56] References Cited

U.S. PATENT DOCUMENTS

| | | |
|---|---|---|
| 2,441,877 | 5/1948 | Flett . |
| 2,458,414 | 1/1949 | Penton . |
| 2,549,860 | 4/1951 | Swanson . |
| 3,771,120 | 11/1973 | Bonazoli et al. . |
| 3,885,876 | 5/1975 | Konopka . |
| 4,532,512 | 7/1985 | Tanner . |
| 4,898,450 | 2/1990 | Jannson et al. . |
| 5,119,090 | 6/1992 | Briatte . |
| 5,161,874 | 11/1992 | Benes . |
| 5,287,104 | 2/1994 | Shemwell . |
| 5,365,354 | 11/1994 | Jannson et al. . |
| 5,420,946 | 5/1995 | Tsai .......................................... 385/22 |
| 5,436,806 | 7/1995 | Kato . |
| 5,440,428 | 8/1995 | Hegg et al. . |
| 5,455,707 | 10/1995 | Cipolla .................................... 359/198 |
| 5,471,327 | 11/1995 | Tedesco et al. . |
| 5,486,984 | 1/1996 | Miller . |
| 5,629,996 | 5/1997 | Rizkin et al. . |
| 5,708,749 | 1/1998 | Kacheria . |

Primary Examiner—James Phan
Attorney, Agent, or Firm—Nilles & Nilles, S.C.

[57] ABSTRACT

A remotely illuminated lighting system (10) incorporates a lighting system sequencer (18) for providing a sequenced distribution of light signals to a plurality of light distribution devices (108, 208, 210 and 212). An illumination source (12) provides focused light signals (44, 46) to the lighting system sequencer (18). The lighting system sequencer (18) includes an optical scanner (22) and an electronic control (24) for selectively directing the light signals (44, 46) to individual optical fibers (20) of a fiber-optic distribution system. The optical fibers (20) couple the light signals to the luminaires (108, 208, 210 and 212), which sequentially illuminate in accordance with a desired pattern.

11 Claims, 4 Drawing Sheets

LIGHTING SYSTEM SEQUENCER AND METHOD

CROSS-REFERENCE TO RELATED APPLICATIONS

The present application is a continuation of U.S. patent application Ser. No. 09/018,081, filed Feb. 3, 1998, pending and entitled "Lighting System Sequencer and Method."

The present application is related to commonly assigned U.S. patent application Ser. No. 09/017,543 entitled "Beamformer for a Remotely Illuminated Lighting System and Method" filed Feb. 3, 1998, the disclosure of which is hereby expressly incorporated herein by reference. The present application is also related to commonly assigned U.S. patent application Ser. No. 08/733,940 entitled "Integrated Beamformer and Method of Manufacture Thereof" filed Oct. 21, 1996, the disclosure of which is hereby expressly incorporated herein by reference.

BACKGROUND OF THE INVENTION

1. Field of the Invention

The present invention relates generally to lighting systems. More particularly, the present invention relates to a sequencer for a remotely illuminated lighting system, and a method of producing a sequenced light pattern.

2. Discussion of the Related Art

Airports incorporate a system of lighting to provide guidance to approaching aircraft. The conventional aircraft approach lighting system (ALS) includes groups of incandescent lamps distributed over a field, lighting several thousand feet of the approach to the runway within specific requirements for angular light distribution, color and intensity. One aspect of the ALS is a series of lights extending along the centerline of the runway that are illuminated in sequence to guide an approaching aircraft along the landing path. Such sequentially illuminated light series are often referred to as "rabbit" lights.

The rabbit lights used in the ALS are typically high intensity incandescent lamps. A mechanical switching system or an electronic controller typically controls a flow of current to each of the lamps for illumination in the desired sequence. The mechanical switching system uses mechanical switches and a switch actuator mechanism, such as a rotating camshaft, to sequentially close the switches. As the switches close, an electric circuit is completed allowing current to flow to an associated lamp. Electro-mechanical relays can replace the mechanical switches. Selective application of current to the relay coil causes opening and closing of the relay contacts for completing the electric circuit. A suitable programmable logic controller, or other control device, may be used to provide the sequenced relay coil currents. In an entirely electronic controller, high-current capacity switching transistors are used to couple current to the lamps in the appropriate sequence.

The mechanical switching systems, including those based upon electromechanical relays, suffer from an increased incidence for maintenance. The switch contacts are prone to wear that must be monitored, and at the appropriate time the contacts must be replaced. Electronic controllers are expensive, and have substantial cooling requirements for the high-current capacity transistors. An additional problem with the use of incandescent lamps in the ALS rabbit lighting system lies with monitoring the many light sources, i.e., each incandescent lamp, for failure. The availability of the ALS is dependent on the number and location of failed lamps in the system. Existing monitoring systems rely on observed lamp currents to infer if a lamp is operating properly. Many factors, including the condition of the contacts and the age of the lamp may effect these current readings resulting in false readings and false indications of lamp failure. Replacing failed lamps is a significant cost owing to the required human and equipment resources and the cost of the lamps. Additionally, diagnosis of lamp failure is not limited to the lamp itself but must also include diagnosis of the mechanical switching system or electronic controller thereby adding time and cost to the maintenance process.

Other applications of sequentially illuminated lighting systems include aerial obstruction lighting systems, road hazard lighting systems, building signage, and the like. Similar to the ALS rabbit lighting system, these systems too rely on a distributed network of incandescent lamps. Failure of an obstruction beacon atop a radio tower can have disastrous consequences for aircraft operating in the area. Replacing failed lamps is not a simple operation, and is certainly not for the faint of heart, as a technician is typically required to scale the tower structure to access the lamp for replacement.

Thus there is a need for a sequencing system that does not rely on mechanical switching and/or electronic switching for generating a light sequence pattern. Additionally, here is a need for a sequenced light system that overcomes the limitations of sequenced light systems relying on a distributed network of incandescent lamps as light sources.

OBJECTS OF THE INVENTION

It is therefore a primary object of the invention to provide a lighting system sequencer hat eliminates mechanical or electronic current switching components.

It is also a primary object of the invention to provide a lighting system sequencer adaptable to a remote illumination source that is selectively coupled to a plurality of light distributing devices.

It is an additional object of the present invention to provide a remotely illuminated light distribution system including a lighting system sequencer meeting the first principal object of the present invention.

Still another object of the present invention is to provide a method of providing a sequenced light distribution pattern.

An additional object of the present invention is to provide a low cost lighting system sequencer having greatly reduced operational maintenance requirements.

Another object of the present invention is to provide a lighting system including a centralized light source, a lighting system sequencer, a fiber optic light distribution system and a plurality of luminaires for achieving a precise sequenced system of lighting.

Other objects, features, and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

1. Resume

A remotely illuminated lighting system incorporates a lighting system sequencer for providing a sequenced distribution of light signals to a plurality of light distribution devices (or luminaires). An illumination source provides focused light signals to the lighting system sequencer. The lighting system sequencer includes an optical scanner and an electronic controller for selectively directing the light signals to individual optical fibers of a fiber-optic distribution system. The optical fibers couple the light signals to the luminaires, which sequentially illuminate in accordance with a desired pattern.

2. Remotely Illuminated Lighting Systems

Figure 1:
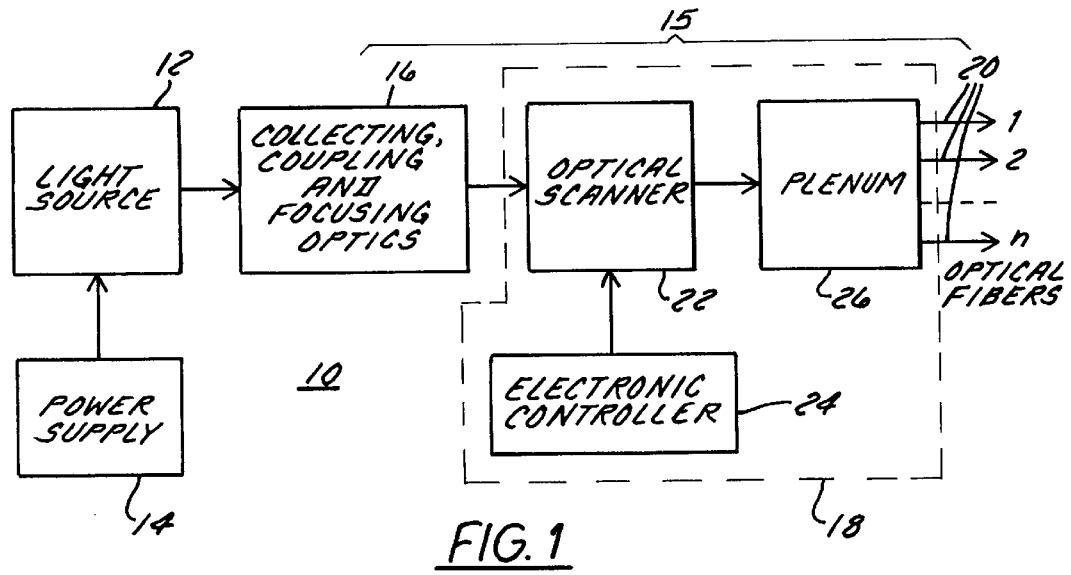
FIG. 1 is a block diagram illustration of a remotely illuminated lighting system incorporating a lighting system sequencer in accordance with a preferred embodiment of the present invention.

Referring now to the drawings, and particularly to FIG. 1, a remotely illuminated lighting system 10 is adaptable for operation as: 1) an approach path illuminator in an approach lighting system (ALS), 2) a marine or aircraft navigation lighting system or 3) an obstruction lighting system. Numerous other applications of remotely illuminated lighting system 10 may be envisioned. The remotely illuminated lighting system 10 includes operatively coupled: 1) a light source 12, 2) a power supply 14, 3) a light manipulating assembly 15 including collecting, coupling and focusing optics 16, and a lighting system sequencer 18, and 4) a plurality of optical fiber cables 20. Light source 12 receives electrical energy from power supply 14 and provides a substantially continuous supply of light energy to light manipulating assembly 15, and particularly, optics 16. Optics 16 collects, focuses and couples the light energy to lighting system sequencer 18. Lighting system sequencer 18 includes an optical scanner 22, an electronic controller 24 and a plenum 26. Under control of electronic controller 24, optical scanner 22 operates to selectively couple the light energy via plenum 26 to selective ones of the optical fiber cables 20. Each of the fiber-optic cables 20 are respectively coupled at a distal end to a luminaire (for example, 108 in FIG. 3 and 208, 210 and 212 in FIG. 4) adapted to diffuse the light into a desired distribution pattern. The luminaires may be of any suitable construction to receive and distribute light signals via fiber-optic cable, but are preferably of the construction shown in the afore-mentioned United States patent applications.

Figure 2:
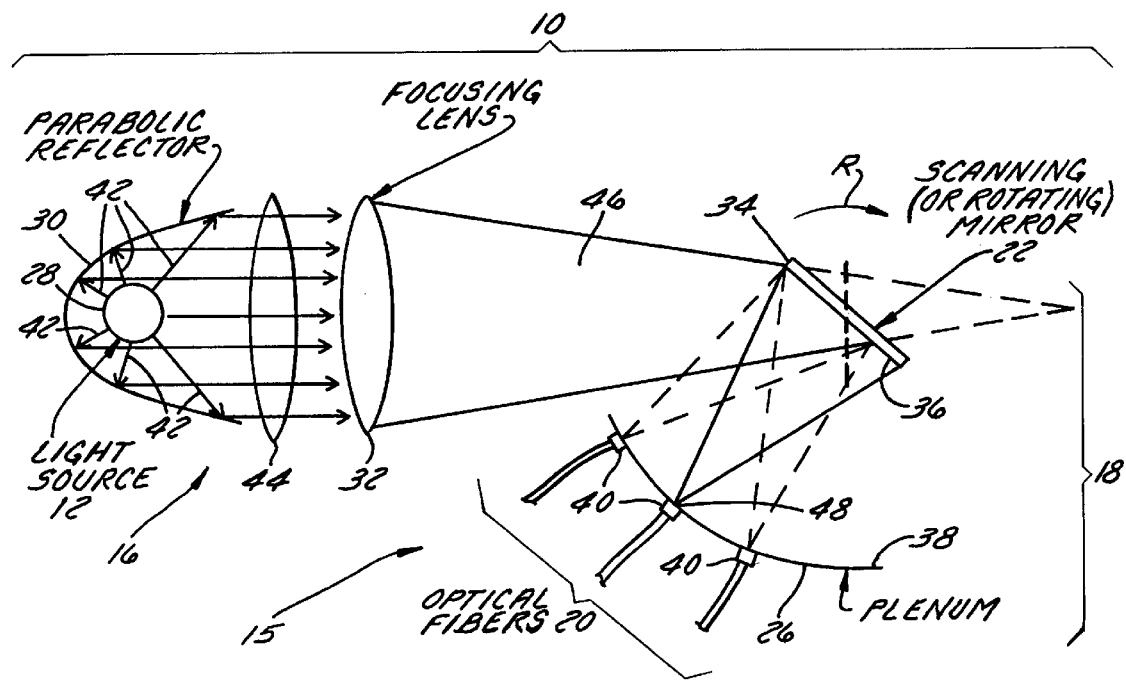
FIG. 2 is a schematic illustration of the remotely illuminated lighting system and the lighting system sequencer represented in FIG. 1.

More particularly, and with reference to FIG. 2, light source 12 emits light energy 42 in the visible range. Optics 16 includes a parabolic reflector 30 that collects the light energy 42 and directs a collected beam of light energy 44 toward focusing lens 32. Focusing lens 32 concentrates the light energy into a focused beam 46 of converging light energy that is directed toward optical scanner 22. Optical scanner 22 preferably includes a scanning or rotating mirror 34 including a reflecting surface 36. Reflecting surface 36 is formed to further direct beam 46 onto a curved coupling surface 38 of plenum 26 at a point of intense light energy 48. Adapted to coupling surface 38 is a plurality of couplers 40 spaced about coupling surface 38 for receiving each of the plurality of fiber-optic cables 20. As seen, curved coupling surface 38 is formed with an arcuate shape and is positioned to remain at a substantially constant radial distance from mirror 34 corresponding to the focal length of mirror 34. Mirror 34 is coupled to a suitable mechanical drive mechanism, as is very well known in the art, for providing an appropriate scanning and/or rotation motion, e.g., in the direction indicated by arrow "R" in FIG. 2. Electronic control 24 may be a multipurpose controller or a dedicated processing device, either of which execute a control algorithm for providing control signals to the mechanical drive mechanism. The control signals are adapted to cause appropriate movement of the mechanical drive mechanism for creating a scanning motion of mirror 34. In the alternative, a dedicated mechanical drive mechanism may be employed, thus forgoing the electronic controller. In this case, however, adaptation of the sequencing pattern will require alteration to the mechanical drive mechanism.

In operation, light source 12 is energized from power supply 14 and the resulting light energy is focused onto mirror 34. Mirror 34 is scanned, or rotated, thus directing the converging light energy toward plenum 26 and causing point 48 to be translated about coupling surface 38. At a location where a coupler 40 is located, light energy is coupled into the associated optical fiber. Under control of electronic controller 24, mirror 34 is caused to scan point 48 between each coupler 40 in a predetermined sequence and dwelling for a predetermined time at each coupler 40 resulting in the respective coupling of light energy into the associated fiber-optic cables 20. Once coupled into a fiber-optic cable 20, the light energy is communicated to the luminaire and diffused. As mirror 34 is scanned and point 48 moves into and out of alignment with a coupler 40, light energy is emitted from the associated luminaire. As will thus be appreciated, mirror 34 can be caused to scan point 48 between each of the couplers 40 in a predetermined pattern causing sequential illumination of the luminaires.

Figure 3:
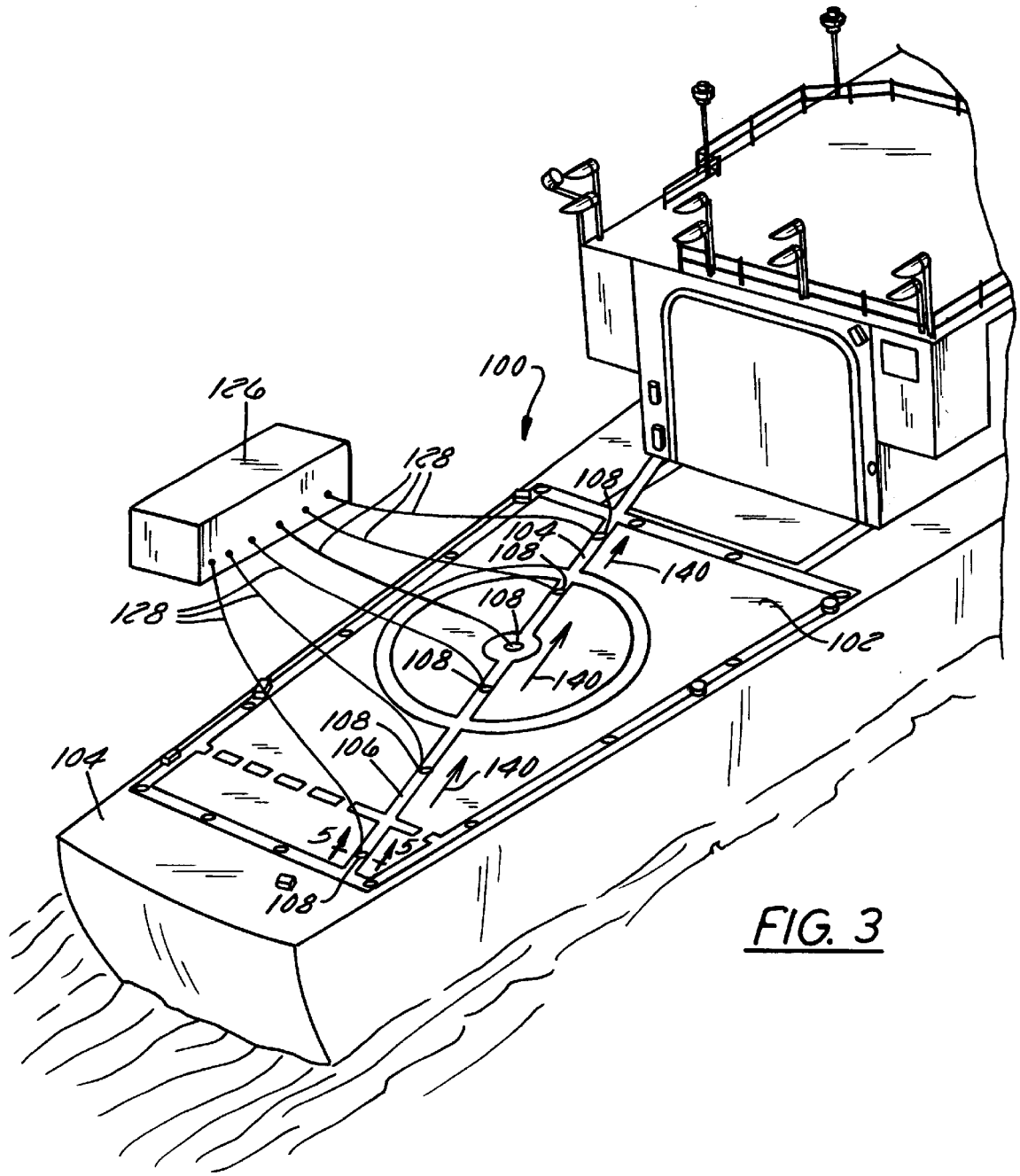
FIG. 3 is a schematic representation of a remotely illuminated lighting system incorporating a lighting system sequencer adapted to a flight deck of a naval vessel in accordance with a preferred embodiment of the present invention.

With reference to FIG. 3, a naval vessel 100 is shown to include a flight deck 102 at an aft portion 104 thereof. Flight deck 102 includes a landing path 106. A remotely illuminated lighting system 126 is coupled via fiber-optic cables 128 to a plurality of light emitting/distributing lenses such as luminaires 108 secured within flight deck 102 along landing path 106. For clarity remotely illuminated lighting system 126 and fiber-optic cables are shown separate from vessel 100, but it will be appreciated that system 126 is suitably secured on-board with fiber-optic cables 128 routed via suitable conduit. System 126 includes a lighting system sequencer and operates in accordance with the above-described embodiments to selectively couple light energy along fiber-optic cables 128 to sequentially illuminate each of the luminaires 108. More particularly, system 126 illuminates luminaires 108 sequentially in the direction of the arrows 140 from the aft portion 104 forward along landing path 106. In this manner, both landing path 106 and the landing direction are indicated to an approaching aircraft.

Figure 5:
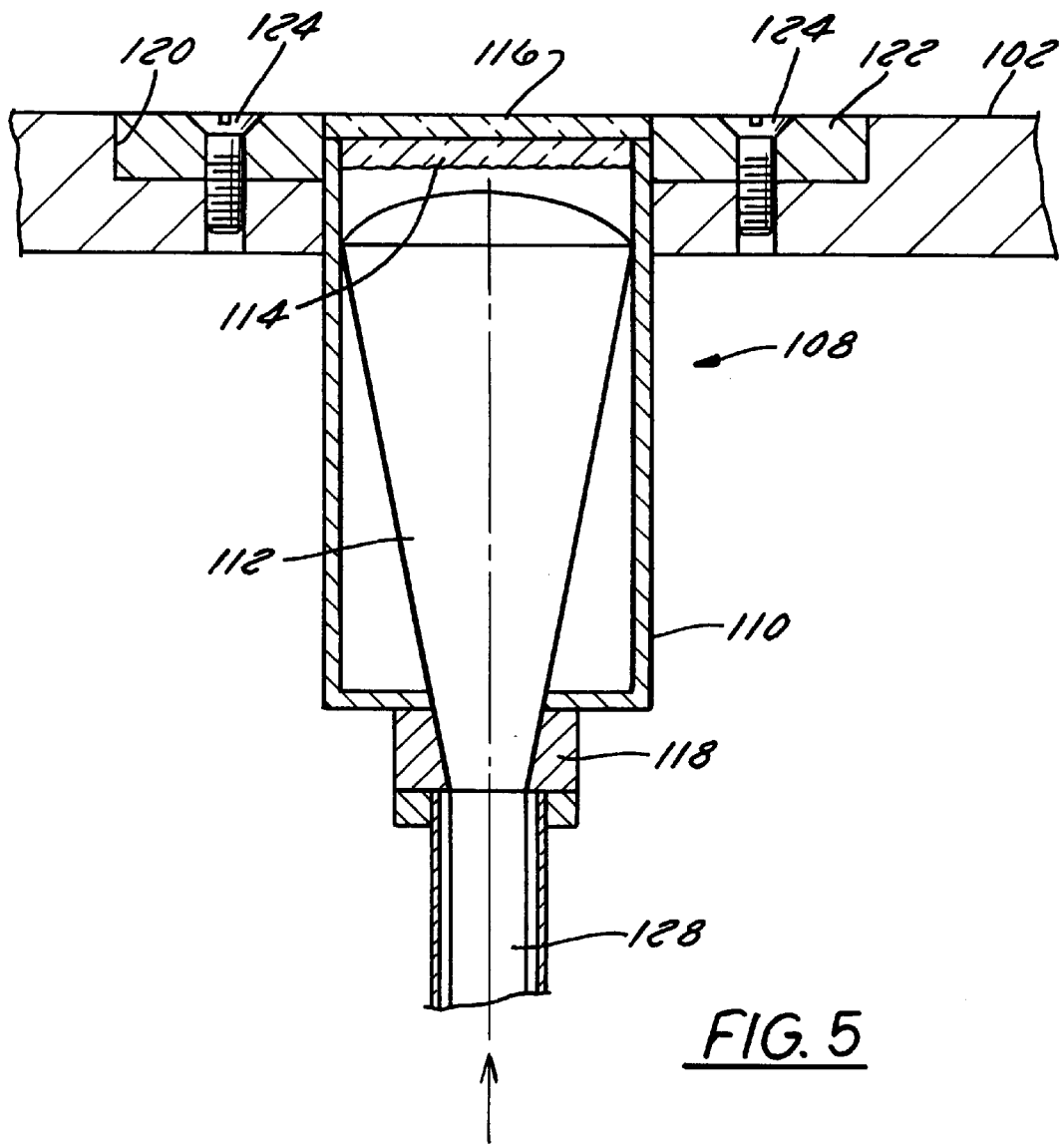
FIG. 5 is a cross-section view taken along line 5—5 of FIG. 3.

With reference to FIG. 5, each luminaire 108 includes a mounting flange 122 received into a recessed aperture 120 formed in flight deck 102 and secured therein using screws 124. Luminaire 108 is positioned with respect to flight deck 102 such that a protective lens 116 thereof is positioned flush to or just slightly below flight deck 102. It should be appreciated that luminaire 108 is exemplary in nature. A discussion of the structure of luminaire 108 is provided to assist in the understanding of the present invention, and no limitation of the invention should be drawn from the following discussion. As previously noted, luminaire 108 may be of any appropriate construction, and several preferred constructions are shown and described in the afore-mentioned United States patent applications. Lens 116 is formed from a suitable high-strength substantially transparent plastic material and is secured to a housing 110 of luminaire 108. Positioned within housing 110 is a non-imaging light transformer 112 coupled via coupler 118 to fiber-optic cable 128. Non-imaging light transformer 112 operates as described in the afore-mentioned United States Patent applications to transform light energy from fiber optic cable 128 toward a diffuser 114. Diffuser 114 may be of any suitable construction and is preferably a volumetric holographic diffuser. Light energy coupled to luminaire 108 along fiber-optic cable 128 is thus radiated outwardly therefrom through lens 116.

Figure 4:
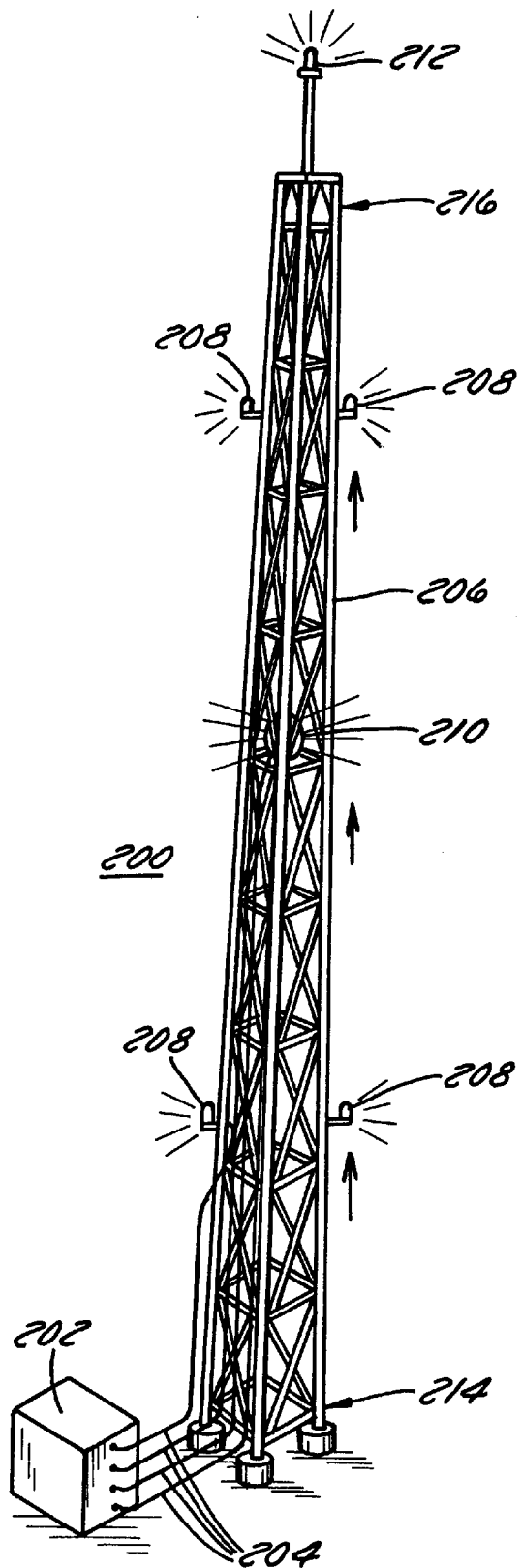
FIG. 4 is a schematic representation of a remotely illuminated lighting system incorporating a lighting system sequencer adapted to a tower structure in accordance with a preferred embodiment of the present invention.

With reference to FIG. 4, another preferred embodiment of the present invention is shown as an obstruction lighting system 200 for a tower 206, such as a radio transmission tower. Obstruction lighting system 200 includes a remotely illuminated lighting system 202 coupled by a plurality of fiber-optic cables 204 to light distributing/emitting lenses such as luminaires 208, 210 and 212 secured to tower 206. In accordance with the previously described preferred embodiments of the present invention, remotely illuminated lighting system 202 includes a lighting system sequencer to sequentially couple light energy to luminaires 208, 210 and 212. More particularly, luminaires are illuminated sequentially from the base portion 214 of tower 206 to a top portion 216 thereof. The luminaires 208, 210 and 212 may be specially adapted depending on where they are positioned on the tower. For example, luminaires 208 may be adapted to provide a less than 360° illumination pattern. While illuminating in a 360° pattern, luminaire 210 may have a limited vertical distribution. Finally, luminaire 212 may be adapted to illuminate in a hemispherical pattern. Reference is once again made to the afore-mentioned United States patent applications, which disclose several embodiments of luminaires for adapting, shaping and controlling a light distribution pattern from a luminaire. It should also be noted that filters might be incorporated into any of luminaires 208, 210 and 212 for providing, for example, red or white light as required for tower lighting guidelines.

Many changes and modifications could be made to the invention without departing from the fair scope and spirit thereof. The scope of some changes is discussed above. The scope of others will become apparent from the appended claims.

We claim:

1. A lighting system sequencer comprising:

A) a light source providing a source of light energy;

B) a light manipulating assembly which conditions the light energy from the light source into converging light energy;

C) a curved coupling surface which has a plenum having a plurality of outputs formed therein, the plenum being adapted to receive the converging light energy from the light manipulating assembly and to optically direct the light energy towards one of the outputs;

D) a light distribution network, the light distribution network comprising a plurality of fiber-optic cables, each fiber optic cable being coupled at a proximal end to a corresponding one of the outputs of the plenum and at a distal end to a light distribution device; and wherein the light manipulating assembly directs the converging light energy towards a selected one of the plurality of fiber-optic cables via a corresponding one of the outputs of the plenum.

2. The lighting system sequencer of claim 1, wherein the light manipulating assembly includes collecting and focusing optics coupled between the light source and the curved coupling surface.

3. The lighting system sequencer of claim 1, wherein the light manipulating assembly comprises a reflector adapted to direct the converging light energy onto a selected location of the plenum.

4. The lighting system sequencer of claim 1, wherein the light manipulating assembly comprises a scanning mirror assembly.

5. The lighting system sequencer of claim 4, wherein the scanning mirror assembly includes a positionable mirror that is adapted to direct the converging light energy at a point and to translate the point between different ones of the outputs in association with scanning movement of the positionable mirror.

6. The lighting system sequencer of claim 5, wherein the curved coupling surface is disposed at a uniform radial distance from the positionable mirror.

7. The lighting system sequencer of claim 6, wherein the uniform radial distance comprises a focal length of the positionable mirror.

8. The lighting system sequencer of claim 5, wherein the scanning mirror assembly further comprises (1) an electronic controller that generates a control signal indicative of a position of the positionable mirror corresponding to a selected one of the fiber optic cables, and (2) a drive mechanism having an input coupled to the electronic controller and an output coupled to the positionable mirror, wherein the drive mechanism is responsive to the control signal to position the positionable mirror.

9. The lighting system sequencer of claim 5, wherein the lighting system sequencer is adapted to one of a group including: an approach landing system, an obstruction identification system, and a vehicle navigation lighting system.

10. An apparatus for sequencing a light signal from a light source to a plurality of light distribution devices, each light distribution device being coupled via a fiber-optic cable to a light signal plenum, the apparatus comprising:

a light manipulating assembly that (1) conditions the light signal from the light source into a converging light signal and (2) couples the converging light signal to selected ones of the fiber-optic cables coupled to the light signal plenum; and wherein the light manipulating assembly comprises a scanning mirror assembly, and wherein the light signal plenum comprises an arcuate surface disposed at a uniform radial distance from the scanning mirror assembly.

11. The apparatus of claim 10, wherein the scanning mirror assembly includes a scanning mirror and the uniform radial distance comprises a focal length of the scanning mirror.

* * * * *